United States Patent
Del Bon et al.

(10) Patent No.: US 10,786,108 B2
(45) Date of Patent: Sep. 29, 2020

(54) METHOD, INFUSION CONTAINER, AND PREPARATION DEVICE FOR PREPARING AN INFUSION BEVERAGE

(71) Applicant: ARCO DESIGN GMBH, Aarburg (CH)

(72) Inventors: Roberto Del Bon, Aarburg (CH); Franco Del Bon, Aarburg (CH); Theodor Wüst, Rüti (CH); Mark Anderson, Horgen (CH); Roger Dejakum, Wetzikon (CH); Daniel F. Keller, Stäfa (CH); Christian Locher, Zürich (CH)

(73) Assignee: ARCO DESIGN GMBH, Aarburg (CH)

( * ) Notice: Subject to any disclaimer, the term of this patent is extended or adjusted under 35 U.S.C. 154(b) by 361 days.

(21) Appl. No.: 15/270,793

(22) Filed: Sep. 20, 2016

(65) Prior Publication Data

US 2017/0042365 A1 Feb. 16, 2017

Related U.S. Application Data

(63) Continuation of application No. PCT/CH2015/000045, filed on Mar. 19, 2015.

(30) Foreign Application Priority Data

Mar. 21, 2014 (CH) ........................................ 436/14

(51) Int. Cl.
*A47J 31/18* (2006.01)
*A47G 19/16* (2006.01)
*A47J 31/06* (2006.01)
*A47J 31/00* (2006.01)
*B65D 85/804* (2006.01)

(52) U.S. Cl.
CPC .............. *A47J 31/18* (2013.01); *A47G 19/16* (2013.01); *A47J 31/002* (2013.01); *A47J 31/0615* (2013.01); *B65D 85/8043* (2013.01)

(58) Field of Classification Search
CPC ... A47J 31/18; B65D 85/804; B65D 85/8043; A47G 19/16
USPC ............................................ 426/431; 436/18
See application file for complete search history.

(56) References Cited

U.S. PATENT DOCUMENTS

| 6,186,051 | B1 | 2/2001 | Aarts |
| 6,358,545 | B1 | 3/2002 | Chandler et al. |
| 2001/0000570 | A1 | 5/2001 | Aarts |
| 2004/0025701 | A1 | 2/2004 | Colston et al. |

FOREIGN PATENT DOCUMENTS

| EP | 1 315 437 A1 | 6/2003 |
| WO | WO 99/05036 A1 | 2/1999 |
| WO | WO 02/19875 A1 | 3/2002 |
| WO | WO 2007/090391 A1 | 8/2007 |

OTHER PUBLICATIONS

International Search Report (PCT/ISA/210) dated Jul. 10, 2015, by the European Patent Office as the International Searching Authority for International Application No. PCT/CH2015/000045.
Written Opinion (PCT/ISA/237) dated Jul. 10, 2015, by the European Patent Office as the International Searching Authority for International Application No. PCT/CH2015/000045.

*Primary Examiner* — Jyoti Chawla
(74) *Attorney, Agent, or Firm* — Buchanan Ingersoll & Rooney PC

(57) ABSTRACT

A method for preparing an infusion beverage is disclosed wherein a dried infusion substance is applied in an infusion container, the latter being present, in the first instance, in a collapsed state and being extendable into an expanded state, An infusion liquid is introduced into the infusion container, wherein the infusion container is expanded. The dried infusion substance in the infusion container is kept in contact with the infusion liquid, in order to form the infusion beverage, over a contact period. The infusion container is then returned to its collapsed state, at least in part, by compression and, in the process, at least some of the infusion beverage is expelled from the infusion container.

10 Claims, 4 Drawing Sheets

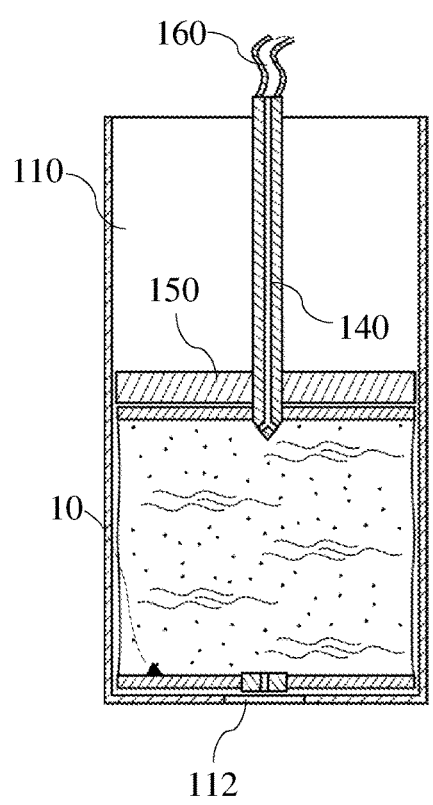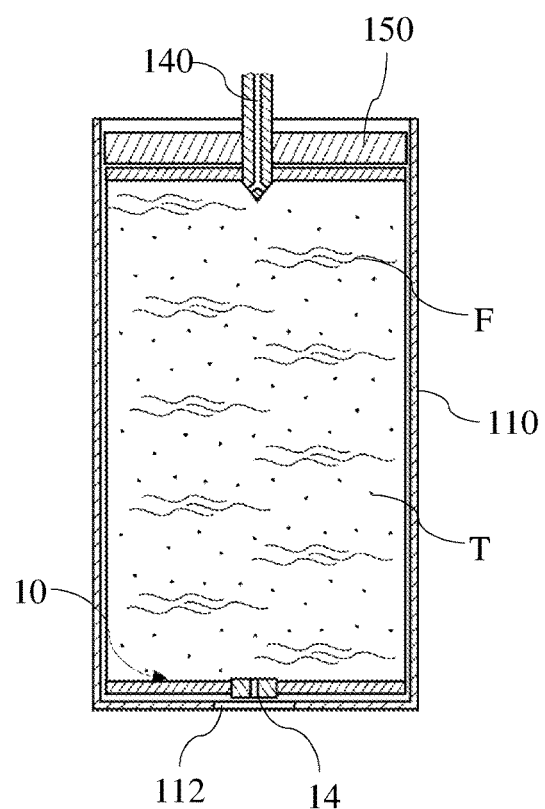
Fig. 5                    Fig. 6

METHOD, INFUSION CONTAINER, AND PREPARATION DEVICE FOR PREPARING AN INFUSION BEVERAGE

RELATED APPLICATIONS

This application claims priority as a continuation application under 35 U.S.C. § 120 to PCT/CH2015/000045, which was filed as an International Application on Mar. 19, 2015 designating the U.S., and which claims priority to Swiss Application 436/14 filed in Switzerland on Mar. 21, 2014. The entire contents of these applications are hereby incorporated by reference in their entireties.

FIELD

The present disclosure relates to a method for preparing an infusion beverage, an infusion container suitable for implementing the method, and a preparation device for the production of an infusion beverage that is designed for use of such an infusion container or for implementing the method.

As referenced herein, infusion beverage is defined as any type of beverage that can be prepared starting from a dried infusion substance by contact with a cold or hot infusion liquid. An exemplary infusion beverage is tea, which is prepared by brewing tea leaves or herbs with hot water.

BACKGROUND INFORMATION

In known automatic tea preparation devices, bags made of liquid-permeable material are used, in which measured amounts of tea leaves are supplied. The tea bags are fixed in the device in a suitable manner, and then usually hot water flows through them under pressure. Also, tea preparation devices in which liquid-tight container capsules with, in each case, a measured amount of tea leaves are used are already known. In these tea preparation devices, the container capsules are perforated and only then does hot water flow through them. Both types of the known tea preparation devices operate in a quick flow-through method, whereby the time during which the tea leaves are in contact with the water is very short.

It is known that various types of tea require a comparatively longer brewing time of several minutes for optimal development of their aromas. The contact time between the tea leaves and the brewing water must therefore be fairly long. This is not the case in the known tea preparation devices.

SUMMARY

A method is disclosed for preparing an infusion beverage, the method comprising: supplying a measured amount of a dried infusion substance (T) in an infusion container, which infusion container is first present in a collapsed configuration and can be extended into an expanded configuration; introducing a measured amount of an infusion liquid (F) into the infusion container into contact with the dried infusion substance, whereby the infusion container is expanded, the dried infusion substance (T) being kept in contact with the infusion liquid in the infusion container for forming the infusion beverage during a contact period; and allowing the infusion container to be returned at least partially into its collapsed configuration by compression, with the infusion beverage being at least partially expelled from the infusion container.

A preparation device is also disclosed for an infusion beverage, the preparation device comprising: a holding device for an infusion container that is configured to contain a dried infusion substance; a reservoir for an infusion liquid; filling means for bringing a metered amount of infusion liquid from the reservoir into the infusion container wherein the filling means has a filling needle that can be driven to pierce the infusion container; an outlet for removing a prepared infusion beverage from the infusion container, wherein the infusion container is liquid-tight for receiving an infusion liquid, the infusion container being configured for expansion from a collapsed configuration into an expanded configuration upon introduction of an infusion liquid; an exhaust valve that opens into the infusion container when an overpressure level is exceeded, wherein the outlet communicates with the exhaust valve of the infusion container; and extrusion means configured to compress the infusion container and as a result to empty an infusion beverage located in the infusion container from the infusion container through the exhaust valve into the outlet.

BRIEF DESCRIPTION OF THE DRAWINGS

Below, exemplary embodiments as disclosed herein will be explained in more detail based on the drawings, wherein:

FIGS. 3-8 each show a diagrammatic partial view of an exemplary embodiment of the preparation device according to the present disclosure in six characteristic phases of the method disclosed herein.

DETAILED DESCRIPTION

Figure 1:
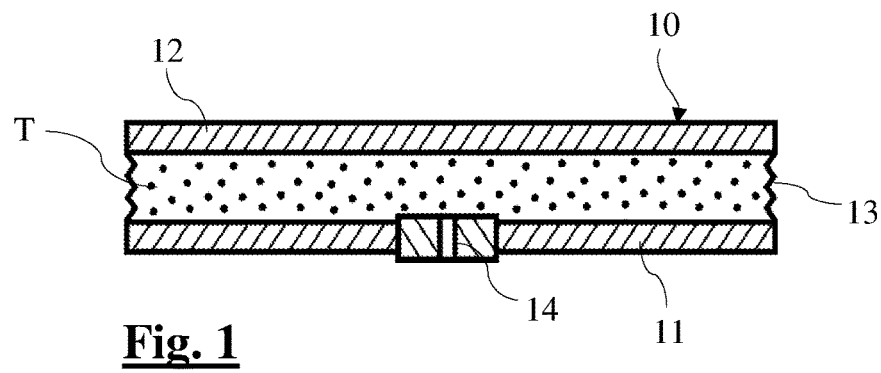
FIG. 1 shows a sectional view of an exemplary embodiment of an infusion container according to the present disclosure in a collapsed initial state.

A method for preparing an infusion beverage suitable for implementation in an automatic preparation device is disclosed, in which method a fairly long contact time between the dried infusion substance and the infusion liquid can be ensured.

In an exemplary method for preparing an infusion beverage as disclosed herein, a measured amount of a dried infusion substance is brought into contact with a measured amount of an infusion liquid, and as a result, the infusion beverage is produced. The dried infusion substance is supplied in an infusion container, which is first present in a collapsed configuration and can be extended into an expanded configuration. The infusion liquid is introduced into the infusion container, whereby the infusion container is expanded. The dried infusion substance is kept in contact with the infusion liquid during a contact period in the infusion container for forming the infusion beverage. The infusion container is then returned at least partially into its collapsed configuration by compression, and in this case, the infusion beverage is at least partially expelled from the infusion container.

As disclosed herein, the preparation of the infusion beverage (e.g., the contact of the dried infusion substance with the infusion liquid), is carried out in an expandable infusion container, which already contains the dried infusion substance and into which the infusion liquid is introduced, whereby the infusion container correspondingly extends. As a result, a requirement for a long contact time between the dried infusion substance and the infusion liquid can be met.

An infusion container as disclosed herein can be suitable for implementing the methods disclosed herein.

An infusion container for receiving a dried infusion substance for the preparation of an infusion beverage, and for implementing methods disclosed herein, is designed and configured liquid-tight for receiving an infusion liquid. In this respect, it is also designed and configured to be extended by infusion liquid from a collapsed configuration into an expanded configuration. And then it is equipped with an exhaust valve that opens into the infusion container when an overpressure level is exceeded.

Advantageously, the infusion container can have a bottom part and a cover part and between them an expandable wall part, whereby the exhaust valve is arranged in the bottom part. The expandable wall part can in this case be designed like an expansion bellows or can be elastically extended or pulled over.

In this case, the cover part can be configured to be pierced.

The infusion container suitably includes a food-compatible material, for example aluminum. The infusion container can also include, at least partially, a transparent and/or a biodegradable material.

A preparation device for an infusion beverage, such as for implementing methods disclosed herein, can include a holding device for an infusion container that contains a dried infusion substance, a reservoir for an infusion liquid, filling means configured as a metering device for bringing a metered amount of infusion liquid from the reservoir into the infusion container, and an outlet for removing prepared infusion beverage from the infusion container. The infusion container is designed and configured liquid-tight for receiving an infusion liquid and also is to be extended by bringing infusion liquid from a collapsed configuration into an expanded configuration and is further equipped with an exhaust valve that opens into the infusion container when an overpressure level is exceeded, whereby the outlet communicates with the exhaust valve of the infusion container. The filling means have a filling needle that can be driven to pierce the infusion container. Also, extrusion means are provided, as an extruder designed and configured to compress the infusion container and as a result to empty the prepared infusion beverage located in the infusion container from the infusion container through the exhaust valve into the outlet.

The preparation device can have heating means, designed as a continuous heater, for heating the infusion liquid to be put into the infusion container.

The preparation device can be suitably equipped with an electronic control unit for the filling means and the extrusion means.

The control unit can have operating elements, by means of which a desired contact period between a dried infusion substance and an infusion liquid can be manually adjusted in the infusion container continuously or in stages, and the control unit can be configured in such a way as to activate the extrusion means after the preset contact period has elapsed.

The control unit can have operating elements, by means of which a desired amount of infusion liquid to be filled in the infusion container can be manually adjusted continuously or in stages, and the control unit is designed and configured so as to fill the preset amount of infusion liquid in the infusion container.

According to another exemplary configuration, the infusion container is provided with an information medium and the preparation device is provided with a sensor, working together with the control unit, for reading the information medium, whereby the information medium contains information with regard to the amount of infusion liquid, the temperature and/or the contact period, and the control unit is designed and configured to control the preparation process based on this information.

A practical example of the preparation of tea involves a dried infusion substance in the form of tea leaves and an infusion liquid in the form of, for example, hot water is used.

The dried infusion substance (e.g., tea leaves) for the preparation of the infusion beverage (for example, tea) is supplied in a special infusion container.

An exemplary infusion container depicted in FIG. 1 is referred to as a whole by 10, and designed liquid-tight, and includes (e.g., consists of) an essentially flat, disk-shaped bottom part 11, a cover part 12 that is also essentially flat and disk-shaped, and a wall part 13 that is designed like an expansion bellows and that connects the bottom part 11 and the cover part 12. An exhaust valve 14 is arranged in the center of the bottom part 11, which exhaust valve is designed as an overpressure valve that opens into the infusion container when a preset internal pressure in the infusion container is exceeded and that closes again in the case of a lower internal pressure. A measured amount of a dried infusion substance T, here in the example, tea leaves, is located in the infusion container 10.

In FIG. 1, the infusion container 10 is depicted in its collapsed initial state, in which the bottom part 11 and the cover part 12 lie relatively close together; the infusion container thus is in a relatively flat state. In this collapsed initial state or collapsed initial configuration, the infusion container 10 essentially corresponds to a known tea bag.

The infusion container 10 as disclosed herein can be designed and configured to extend from its collapsed initial configuration into an expanded state or an expanded configuration, whereby the capacity or volume of the infusion container 10 in the expanded state is a multiple of the volume in its collapsed state. This extendability of the infusion container 10 is achieved by the design of its wall part 13 that is like an expansion bellows. The extension or expansion of the infusion container 10 from its collapsed initial configuration into its expanded configuration is carried out, as further explained in still more detail below, by introducing infusion liquid into the infusion container 10. In this case, the infusion container 10 extends in the axial direction similar to a small cylindrical lamp. In FIG. 6, the infusion container 10 is shown in the fully expanded state.

The infusion container 10 includes (e.g., consists of) a food-compatible material, for example aluminum, which optionally also can be coated. The infusion container 10 can, however, also include (e.g., consist at least partially of) a biodegradable material, or else be made completely or partially transparent. Depending on the materials used, the infusion container 10 remains in its collapsed configuration by itself. It can also be provided, however, with holding means that can be broken up in order to keep it in its collapsed configuration. These holding means would then break open when being filled with infusion liquid.

The expandability of the infusion container 10 can also be achieved in that the wall part between the bottom part and the cover part is designed and configured elastically extended or pulled over instead of like an expansion bellows.

Figure 2:
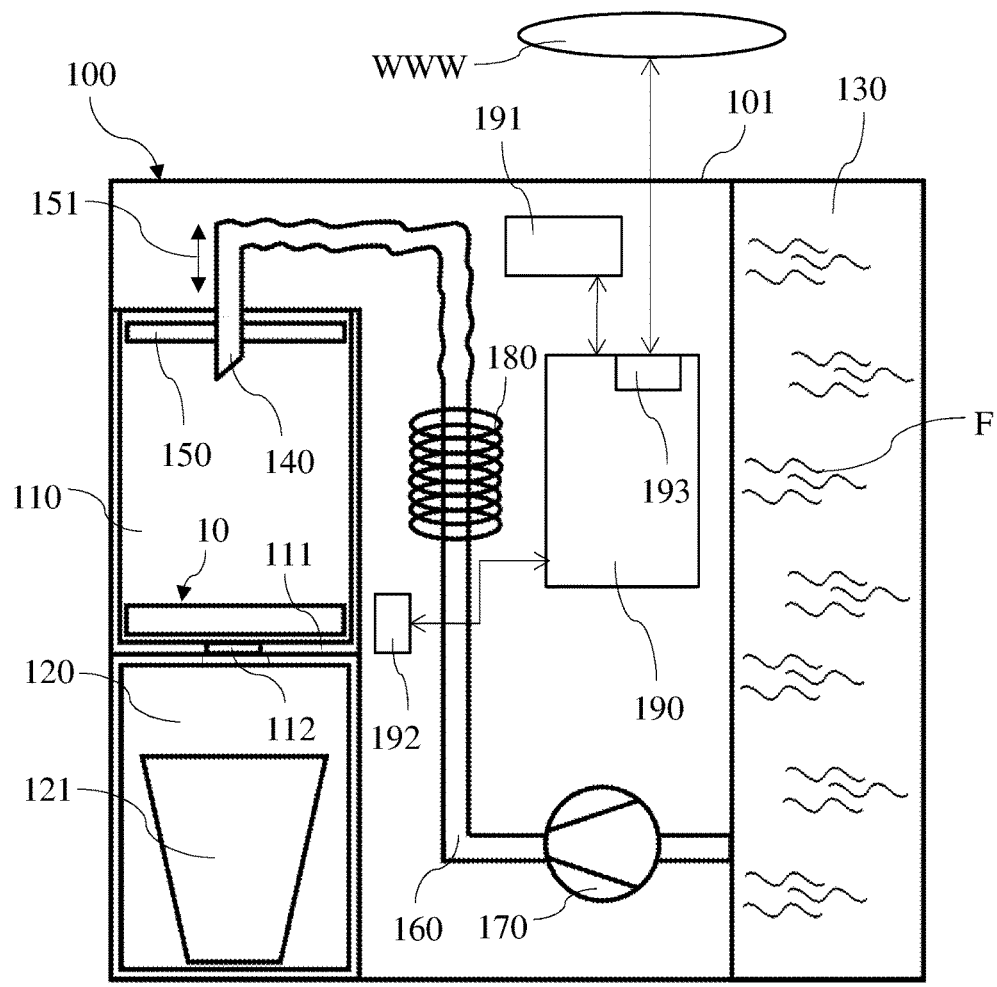
FIG. 2 shows a diagrammatic overall view of an exemplary preparation device according to the present disclosure.

In FIG. 2, an exemplary preparation device for an infusion beverage is diagrammatically depicted, in which device infusion containers 10 of the above-described type are used.

The exemplary preparation device, referred to as a whole by 100, includes, in a housing 101, a preparation cylinder 110, a receiving space 120 for a receiving vessel 121 for a finish-prepared infusion beverage under this cylinder, a reservoir 130 for an infusion liquid F, a filling needle 140, an extrusion piston 150, a partially flexible liquid line 160 that connects the reservoir 130 to the filling needle 140, a liquid pump 170, a continuous heater 180 and an electronic control unit 190 with operating elements 191. The filling needle 140 and the extrusion piston 150 can be moved up and down together by means of a motor drive in the preparation cylinder 110 symbolized only by a double arrow 151. The control unit 190 controls the movement of the filling needle 140 and the extrusion piston 150 as well as the liquid pump 170 and the continuous heater 180. Additional details follow from the description below of an exemplary operating mode of the preparation device.

Figure 3:
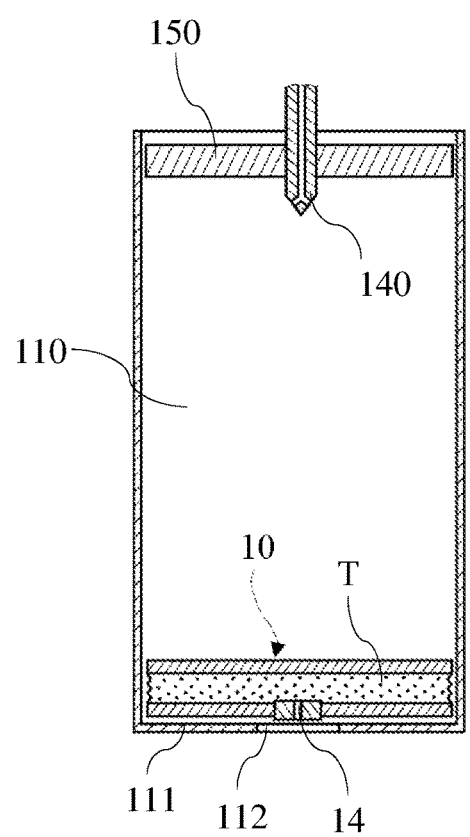

Starting from an infusion container 10, already described above, filled with tea leaves or a common dried infusion substance, an exemplary preparation method disclosed herein for an infusion beverage in the above-described preparation device is executed as follows:

In a preparatory step (FIGS. 2 and 3), the infusion container 10 that is still in its collapsed initial state is introduced through an access window, not shown, into the preparation cylinder 110 of the preparation device 100. The preparation cylinder 110 has a bottom 111, in which an opening 112 is located, which opening forms an outlet for the prepared infusion beverage. The infusion container 10 rests on the bottom 111; the latter thus forms a holding device for the infusion container 10. The outlet opening 112 is located in the infusion container 10 that is introduced into the preparation cylinder 110 below the exhaust valve 14 of the container, so that it communicates with the valve.

Figure 4:
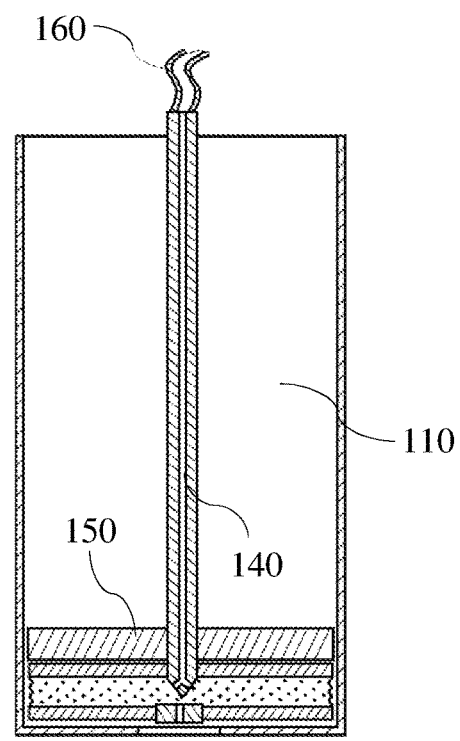

After a start command that is communicated by means of the operating elements 191, the control unit 190 ensures the movement of the filling needle 140 and the extrusion piston 150 downward to the infusion container 10 until the filling needle 140 pierces the cover part 12 of the infusion container 10, whereby the cover part 12 of the infusion container 10 is, of course, designed and configured so that it can be pierced by the filling needle 140. The extrusion piston 150 in this case rests on the cover part 12 (FIG. 4).

In the next step, the control unit 190 ensures that a measured amount of infusion liquid F is pumped from the reservoir 130 via the line 160 by the filling needle 140 into the infusion container 10. As a result, the infusion container 10 is gradually expanded in the axial direction until it finally achieves its fully expanded configuration. During the expansion of the infusion container 10, the filling needle 140 and the extrusion piston 150 are pushed upward following the expansion of the infusion container 10. This can be carried out actively by the control unit 190 or passively by the expanding infusion container 10. FIG. 5 shows the infusion container 10 expanded by approximately 50%; FIG. 6 shows the infusion container 10 in its fully expanded configuration.

So that, during the filling of the infusion container 10, no infusion liquid can exit from the infusion container 10 and contaminate the surrounding preparation cylinder 110, exemplary embodiments are configured such that the filling needle 140 will pierce the cover part 12 of the infusion container 10 in a snug manner or that other sealing means (e.g., an O-ring) are provided that seal the puncture point.

During the filling of the infusion container 10 with infusion liquid F and during a subsequent time span, the contact of the dried infusion substance T with the infusion liquid F is carried out in the infusion container 10, whereby then the finished infusion beverage is finally produced in the infusion container 10. In connection with the preparation of tea, the phase after water is poured into the infusion container is also referred to as brewing.

Figure 7:
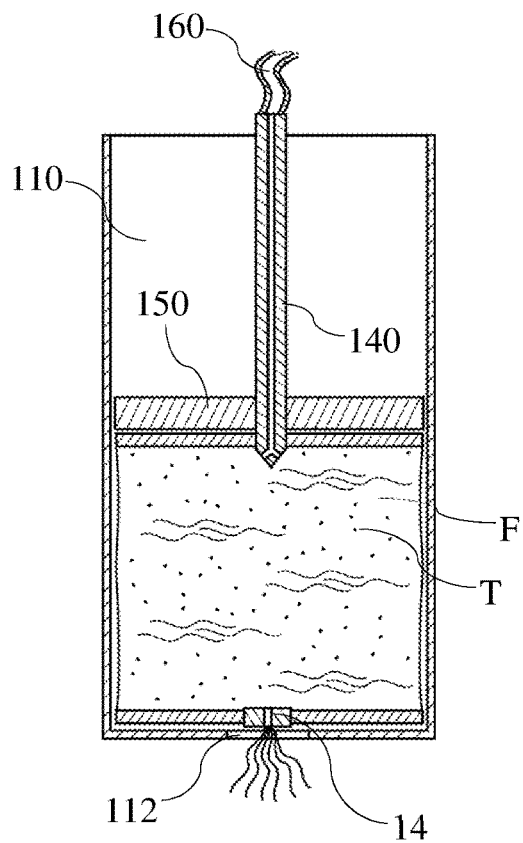

After the above-mentioned time span, the finished infusion beverage is removed from the infusion container 10. In this respect, the control unit 190 ensures that the extrusion piston 150 (together with the filling needle 140) is moved downward. In this case, the extrusion piston 150 presses on the cover part 12 of the infusion container 10 and crushes the latter. As a result, in turn, an elevated internal pressure is produced in the interior of the infusion container 10, which leads to the exhaust valve 14 opening in the bottom part 11 such that the finished infusion beverage is expelled from the infusion container 10 through the exhaust valve 14 and the outlet 112 and bursts out into the receiving vessel 121 without coming into contact with the preparation device itself. The dried infusion substance, (e.g., the tea leaves), in this case remains in the infusion container. FIG. 7 illustrates the situation during the emptying of the infusion container 10.

Figure 8:
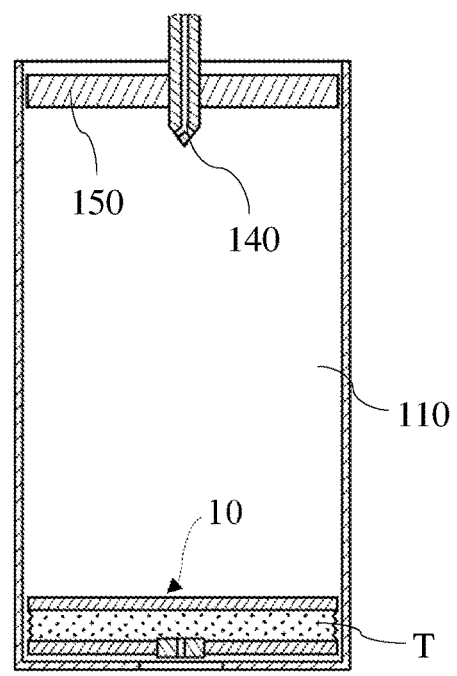

When the infusion beverage is completely expelled from the infusion container 10, the latter again assumes its original, collapsed initial configuration. The extrusion piston 150 and the filling needle 140 are then run into their original positions again in a final step (FIG. 8).

With these steps, a complete cycle of an exemplary preparation method according to the present disclosure is concluded. Now, the cycle can be repeated either with a fresh infusion container, or, if desired, with the same infusion container. Ultimately, the infusion container 10 is then either removed manually from the preparation device 100 or automatically ejected via ejection means, not shown, or ejected into a collecting tank.

The control unit 190 is designed and configured such that the contact period, during which the dried infusion substance T in the infusion container 10 is or remains in contact with the infusion liquid F, can be adjusted via the operating elements 191 continuously or in stages. Also, the control unit 190 can be designed to the extent that the amount of infusion liquid F fed into the infusion container 10 can be adjusted via the operating elements 191 thereof continuously or in stages. In addition, the control unit 190 can also be designed and configured to the extent that the temperature, to which the continuous heater 180 heats the infusion liquid, can be adjusted via the operating elements 191 thereof continuously or in stages. With a variable contact period and a variable amount of infusion liquid and optionally a variable temperature of the infusion liquid, the preparation of the infusion beverage can be optimized or adjusted to personal taste.

According to another aspect of the present disclosure, the infusion container 10 can also be provided with an information medium, which can contain information on, e.g., the optimal amount of infusion liquid and/or the optimal temperature of the infusion liquid and/or the optimal contact period. In the preparation device, a sensor 191 that works together with the control unit 190 can then be provided, which sensor can read information contained in the information medium, whereby then the control unit 190 would automatically control the preparation process corresponding to this information. As information media, for example, bar codes or RFID elements would be suitable.

According to another aspect of the present disclosure, the control unit 190 can also have means 193 (e.g., communication interface) that tie it to the WWW Internet and make it possible to perform operations or exercise remote control via the Web.

Preparation methods according to the present disclosure can, of course, accordingly also be performed without the above-described preparation device.

Exemplary embodiments have been explained in connection with the preparation of tea. The methods and the preparation devices according to the present disclosure can, however, accordingly also be used for the preparation of other beverages, which can be produced by contact of a dried infusion substance with infusion liquid. The dried infusion substance can in this case also be soluble in the infusion liquid, whereby contact is accordingly defined as the process of the dried infusion substance dissolving in the infusion liquid.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for preparing an infusion beverage, the method comprising:
   supplying a measured amount of a dried infusion substance (T) in an infusion container, the infusion container including, an essentially flat disk-shaped bottom part, an essentially flat disk-shaped cover part, an expandable bellows wall part connecting the bottom part and the cover part, wherein the bottom part, the cover part and the expandable part are liquid tight, and an exhaust valve that opens when an overpressure level in the infusion container is exceeded, the exhaust valve being arranged in the bottom part for exhausting an infusion liquid from the infusion container;
   introducing a measured amount of the infusion liquid (F) into the infusion container into contact with the dried infusion substance, whereby the infusion container is expanded by the infusion liquid from a collapsed configuration to an expanded configuration, the dried infusion substance (T) being kept in contact with the infusion liquid in the infusion container for forming the infusion beverage during a contact period; and
   allowing the infusion container to be returned at least partially into its collapsed configuration by compression, with the infusion beverage being at least partially expelled from the infusion container.

2. An infusion container for receiving a dried infusion substance for the preparation of an infusion beverage, the infusion container comprising:
   an essentially flat disk-shaped bottom part;
   an essentially flat disk-shaped cover part;
   an expandable bellows wall part connecting the bottom part and the cover part, wherein the bottom part, the cover part and the expandable part are liquid tight, the infusion container configured to receive an infusion liquid and to be expanded by the infusion liquid from a collapsed configuration into an expanded configuration; and
   an exhaust valve that opens when an overpressure level in the infusion container is exceeded, the exhaust valve being arranged in the bottom part for exhausting the infusion liquid from the infusion container.

3. The infusion container according to claim 2, wherein the cover part is configured to be pierced by an infusion liquid filling needle.

4. The infusion container according to claim 3, comprising:
   a food-compatible material for contacting an infusion material and the dried infusion substance during use.

5. The infusion container according to claim 2, wherein the exhaust valve is arranged in a center of the bottom part.

6. A preparation device for an infusion beverage, the preparation device comprising:
   a holding device for an infusion container that is configured to contain a dried infusion substance;
   a reservoir for an infusion liquid;
   filling means for bringing a metered amount of the infusion liquid from the reservoir into the infusion container wherein the filling means has a filling needle that can be driven to pierce the infusion container;
   an outlet for removing a prepared infusion beverage from the infusion container, wherein the infusion container is liquid-tight for receiving an infusion liquid, the infusion container including,
   an essentially flat disk-shaped bottom part,
   an essentially flat disk-shaped cover part,
   an expandable bellows wall part connecting the bottom part and the cover part, the infusion container configured to be expanded by the infusion liquid from a collapsed configuration into an expanded configuration and including an exhaust valve that opens when an overpressure level in the infusion container is exceeded for exhausting the infusion liquid from the infusion container, wherein the outlet communicates with the exhaust valve of the infusion container; and
   extrusion means configured to compress the infusion container and as a result to empty an infusion beverage located in the infusion container from the infusion container through the exhaust valve into the outlet.

7. The preparation device according to claim 6, comprising: heating means for continuous heating of the infusion liquid when introduced into the infusion container.

8. The preparation device according to claim 6, comprising:
   an electronic control unit for controlling the filling means and the extrusion means.

9. The preparation device according to claim 8, wherein the control unit comprises:
   operating elements, by which a contact period between the dried infusion substance and the infusion liquid will be manually adjusted in the infusion container continuously or in stages, the control unit being configured in such a way as to activate the extrusion means after the preset contact period has elapsed.

10. The preparation device according to claim 8, wherein the control unit comprises:
    operating elements, by which an amount of the infusion liquid to be filled in the infusion container will be manually adjusted continuously or in stages, the control unit being configured so as to fill a preset amount of the infusion liquid in the infusion container.

* * * * *